(12) United States Patent
Kumar et al.

(10) Patent No.: US 9,436,295 B2
(45) Date of Patent: Sep. 6, 2016

(54) ALTERNATE DYNAMIC KEYBOARD FOR CONVERTIBLE TABLET COMPUTERS

(71) Applicant: Intel Corporation, Santa Clara, CA (US)

(72) Inventors: Arvind Kumar, Beaverton, OR (US); Duncan Glendinning, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 14/229,655

(22) Filed: Mar. 28, 2014

(65) Prior Publication Data
US 2015/0277580 A1 Oct. 1, 2015

(51) Int. Cl.
*G06F 3/023* (2006.01)
*G06F 3/0488* (2013.01)

(52) U.S. Cl.
CPC ......... *G06F 3/0238* (2013.01); *G06F 3/04886* (2013.01)

(58) Field of Classification Search
CPC .................. G06F 3/0238; G06F 3/04886
USPC ........................................ 715/773
See application file for complete search history.

(56) References Cited

U.S. PATENT DOCUMENTS

| | | | | |
|---|---|---|---|---|
| 4,688,020 A * | 8/1987 | Kuehneman | .......... | G06F 3/0238 341/22 |
| 5,949,408 A * | 9/1999 | Kang | .......... | G06F 1/1618 345/100 |
| 7,154,480 B2 * | 12/2006 | Iesaka | .......... | G06F 1/1616 345/168 |
| 7,705,799 B2 * | 4/2010 | Niwa | .......... | G06F 1/1616 345/1.1 |
| 8,200,866 B2 * | 6/2012 | Salman | .......... | G06F 3/0237 341/22 |
| 9,128,664 B1 * | 9/2015 | Tabone | .......... | G06F 1/1616 |
| 2002/0000977 A1 * | 1/2002 | Vranish | .......... | G06F 3/044 345/173 |
| 2003/0201982 A1 * | 10/2003 | Iesaka | .......... | G06F 1/1616 345/168 |
| 2004/0027338 A1 * | 2/2004 | Lampson | .......... | G06F 1/162 345/173 |
| 2004/0233620 A1 * | 11/2004 | Doczy | .......... | G06F 1/1626 361/679.15 |
| 2005/0083644 A1 * | 4/2005 | Song | .......... | G06F 1/162 361/679.06 |
| 2005/0146447 A1 * | 7/2005 | Na | .......... | G06F 3/0219 341/26 |
| 2005/0207104 A1 * | 9/2005 | Love | .......... | G06F 1/162 381/679.07 |
| 2006/0075934 A1 * | 4/2006 | Ram | .......... | B60N 3/004 108/44 |
| 2007/0051792 A1 * | 3/2007 | Wheeler | .......... | G06F 3/0482 235/375 |

(Continued)

FOREIGN PATENT DOCUMENTS

KR  1020100059299 A  6/2010
WO  2013159170 A1  10/2013

OTHER PUBLICATIONS

Coach's Eye, "Side-By-Side Video Comparison," Coach's Eye Product Overview, retrieved Mar. 24, 2014, <http://www.coachseye.com/features>, 4 pages.

(Continued)

*Primary Examiner* — Reza Nabi
(74) *Attorney, Agent, or Firm* — Jordan IP Law, LLC

(57) ABSTRACT

Systems and methods may provide for detecting an event on a computing device having an embedded keyboard with a default mapping of keys to functions and disabling a first subset of keys on the embedded keyboard in response to the event. Additionally, a second subset of keys on the embedded keyboard may be re-mapped to one or more different functions if an application running on the computing device supports keyboard re-mapping. In one example, re-mapping the second subset of keys includes grouping two or more keys in the second subset into a common function.

17 Claims, 6 Drawing Sheets

(56) References Cited

U.S. PATENT DOCUMENTS

| | | | | |
|---|---|---|---|---|
| 2008/0235789 A1* | 9/2008 | Erwin | G06F 17/30873 | 726/19 |
| 2009/0070595 A1* | 3/2009 | Delia | G06F 21/83 | 713/189 |
| 2010/0113100 A1* | 5/2010 | Harmon | H04M 1/0216 | 455/566 |
| 2010/0194692 A1* | 8/2010 | Orr | G06F 3/0414 | 345/173 |
| 2010/0203925 A1* | 8/2010 | Nagai | H04M 1/0225 | 455/566 |
| 2011/0215954 A1* | 9/2011 | Page | G06F 3/0235 | 341/22 |
| 2011/0242391 A1* | 10/2011 | Senatori | G06F 1/1616 | 348/333.01 |
| 2011/0248838 A1* | 10/2011 | Krahenbuhl | G06F 1/1626 | 340/407.2 |
| 2011/0248947 A1* | 10/2011 | Krahenbuhl | G06F 1/1626 | 345/174 |
| 2011/0261058 A1* | 10/2011 | Luo | G06F 1/1626 | 345/441 |
| 2012/0111173 A1* | 5/2012 | Bowen | G10H 1/34 | 84/170 |
| 2013/0086510 A1* | 4/2013 | Lee | G06F 9/4443 | 715/781 |
| 2013/0154981 A1* | 6/2013 | Park | H04M 1/274558 | 345/173 |
| 2013/0278565 A1* | 10/2013 | Park | G06F 3/04886 | 345/178 |
| 2014/0215632 A1* | 7/2014 | Adderly | G06F 21/31 | 726/26 |
| 2015/0109151 A1* | 4/2015 | Page | G06F 3/04886 | 341/22 |
| 2015/0192956 A1* | 7/2015 | Whorton | B01J 31/02 | 361/679.43 |
| 2015/0277580 A1* | 10/2015 | Kumar | G06F 3/04886 | 345/172 |

OTHER PUBLICATIONS

Ubersense Inc., "Video Analysis & Sports Coaching App," ubersense.com, retrieved Mar. 24, 2014, 4 pages.

International Search Report and Written Opinion for PCT Application No. PCT/US2015/023218, dated Jul. 27, 2015, 11 pages.

* cited by examiner

ALTERNATE DYNAMIC KEYBOARD FOR CONVERTIBLE TABLET COMPUTERS

TECHNICAL FIELD

Embodiments generally relate to convertible computing devices. More particularly, embodiments relate to alternate dynamic keyboard mappings for computing devices that are convertible into tablet mode.

BACKGROUND

Recently developed computing devices may provide users with the ability to convert the device between a notebook mode (e.g., a physical keyboard and display connected in a clamshell configuration) and a tablet mode (e.g., the physical keyboard folded behind a touch enabled display in a single piece configuration). In order to prevent inadvertent key presses in the tablet mode, the physical keyboard may typically be disabled in its entirety while folded behind the touch enabled display, wherein the touch enabled display may present a virtual keyboard to the user when data entry is appropriate. In some cases, interacting with the virtual keyboard may involve holding the device in one hand and typing with the other. Such an approach may be awkward for the user and may result in inefficient data entry.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
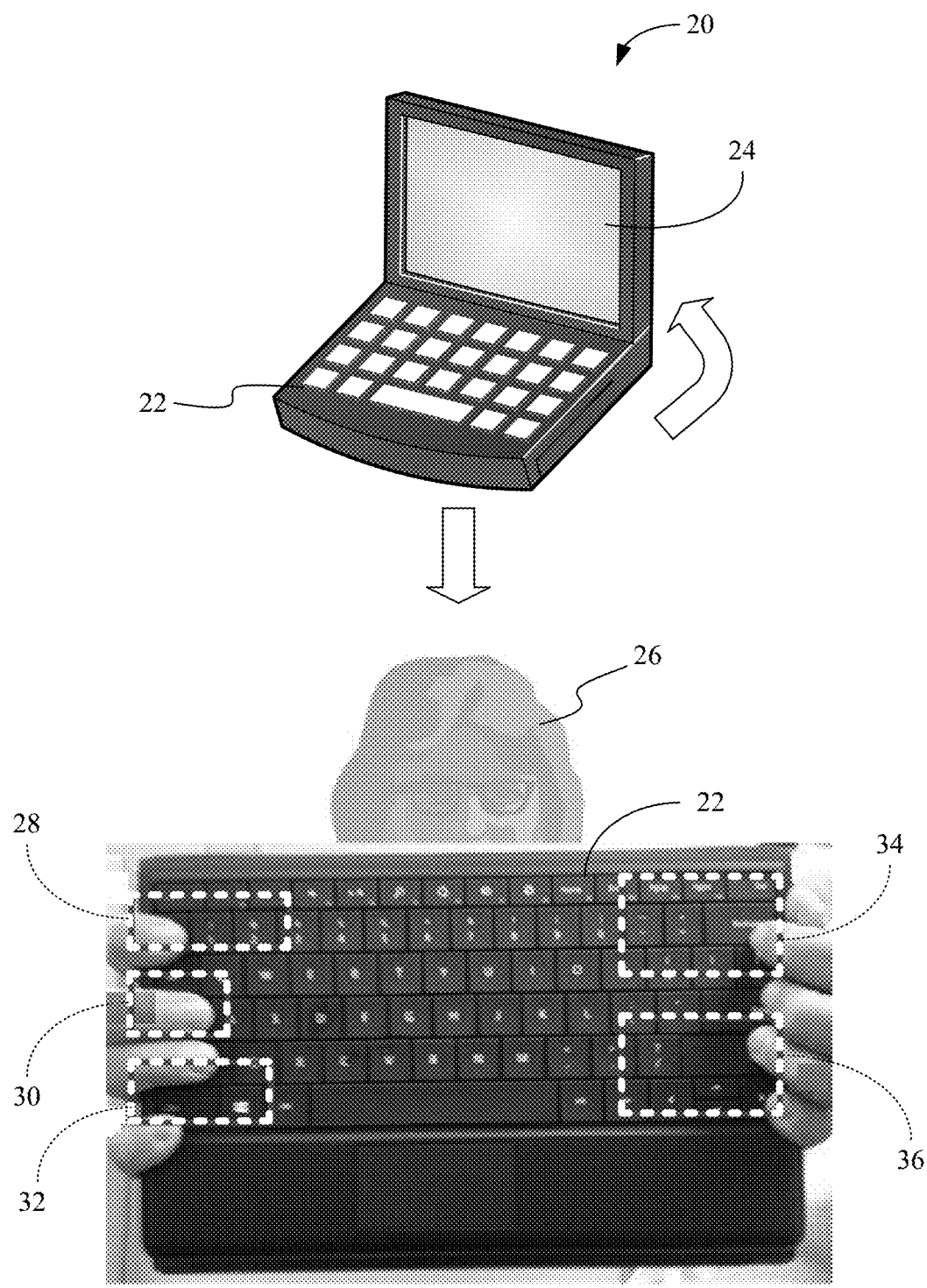
FIG. 1 is an illustration of an example of an alternate keyboard for a convertible tablet computer according to an embodiment.

Turning now to FIG. 1, a computing device 20 having an embedded keyboard 22 with a default mapping of keys to functions is shown. In the illustrated example, the embedded keyboard 22 and a display 24 are originally in a clamshell mode in which the device 20 may be used as a traditional notebook computer. When the embedded keyboard 22 is rotated by a user 26 behind the display 24, the computing device 20 may enter a tablet mode in which the computing device 20 is used as a tablet computer. Thus, in the tablet mode, the display 24 may face the user 26 and be used as a touch screen input device. Rather than disabling all of the keys of the embedded keyboard 22 while the computing device 20 is in the tablet mode, the illustrated computing device 20 re-maps at least a subset of the keys on the embedded keyboard 22 to different functions so that the user 26 may continue to use the embedded keyboard 22 from the back of the computing device 20.

For example, any one of a first group 28 of keys may be pressed by a top finger on the right hand of the user 26 to perform a first function, a second group 30 of keys may be pressed by a middle finger on the right hand of the user 26 to perform a second function, a third group 32 of keys may be pressed by a bottom finger on the right hand of the user 26 to perform a third function, and so forth, wherein the first, second and third functions may be different from the default functions of the keys in question. Similarly, a fourth group 34 of keys might be pressed by a top finger on the left hand of the user 26 to perform a fourth function, a fifth group 36 of keys may be pressed by a bottom finger on the left hand of the user 26, and so forth, wherein the fourth and fifth functions may also be different from the default functions of the keys in question.

The new functions of the re-mapped groups of keys may vary depending upon the circumstances. For example, if a game application is running (e.g., in the display foreground), the new functions might include Fire, MoveUp, MoveDown, MoveLeft, MoveRight and/or other game related controls. If, on the other hand, a web browser application is running, the new functions may include ScrollUp, ScrollDown and/or other web page controls. Similarly, if a media playback application is running, the new functions may include, for example, Play, Pause, FastForward, Rewind and/or other media controls. Additionally, if the user begins interacting with a different application (e.g., the application is switched), the new foreground application may provide different mappings based on the type of application. Indeed, if no application is in the foreground and, for example, the system home screen is showing, the new functions might include moving tiles left or right, opening system charm/menu screens and/or other operating system (OS) controls (e.g., "OS tablet mode"). The remaining keys outside the re-mapped groups of keys may be disabled to prevent inadvertent key presses and unintended functions from taking place.

The computing device 20 may also be operated in a "training mode" in which the user 26 is prompted, via the display 24 or other suitable user interface (UI, e.g., microphone, vibratory module), to press the different re-mapped regions of the keyboard 22. In such a case, the re-mappings may be calibrated and/or adjusted based on the hand size, finger length, manual dexterity, etc., of the specific user 26 to improve accuracy and the user experience.

Figure 2:
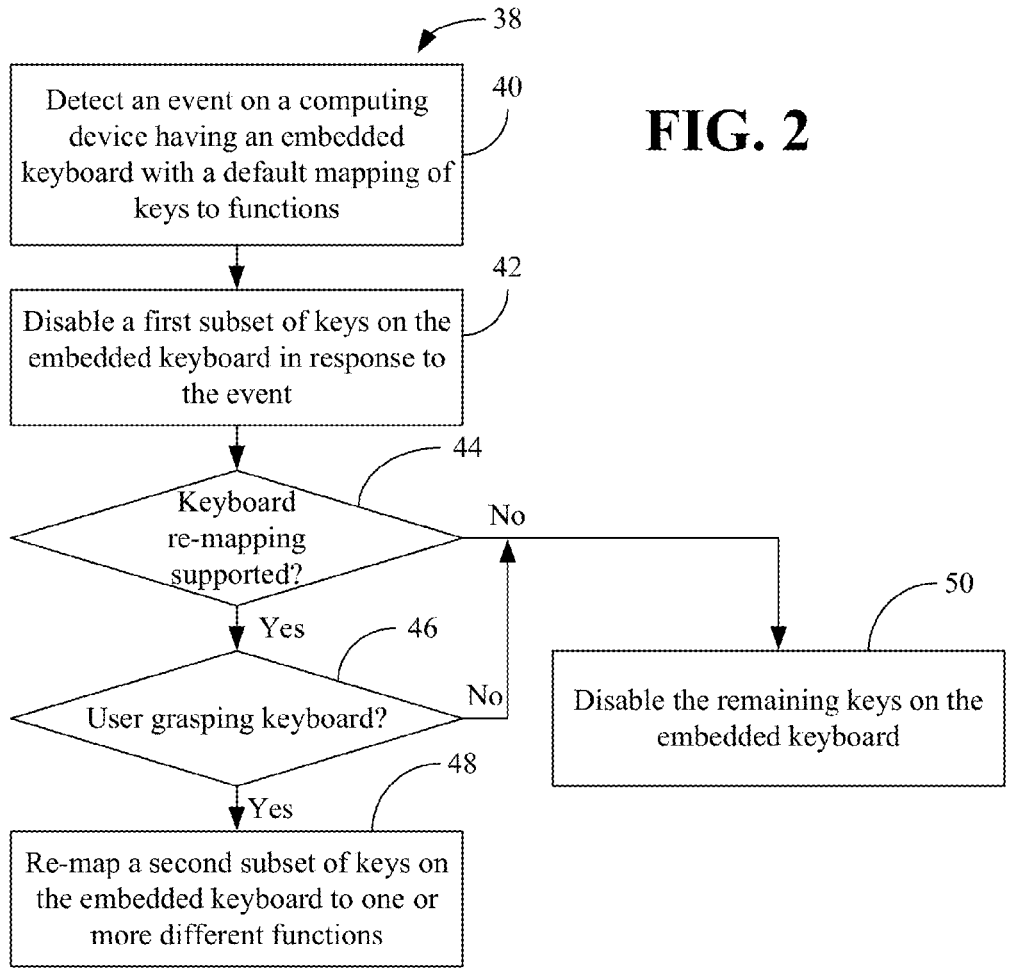
FIG. 2 is a flowchart of an example of a method of activating an alternate keyboard according to an embodiment.

Turning now to FIG. 2, a method 38 of activating an alternate keyboard is shown. Illustrated processing block 40 provides for detecting an event on a computing device having an embedded keyboard with a default mapping of keys to functions. As will be discussed in greater detail, the event may be a physical transition of the computing device into the tablet mode, a transition of the computing device into an active state while the computing device is in the tablet mode, a launch of an application while the computing device is in the tablet mode, and so forth. Detection of the tablet mode may be made by analyzing sensor data such as, for example, accelerometer data, gyroscope data, lid switch data, camera data, etc., obtained from one or more sensors on the computing device. A first subset of keys on the embedded keyboard may be disabled at block 42, wherein a determination may be made at block 44 as to whether an application running on the computing device supports keyboard re-mapping. As already noted, the application may include, for example, a game application, a web browser application, a media playback application, an image capture application, an OS, etc., or any combination thereof. The determination at block 44 may also determine whether the application is in the foreground (e.g., not minimized or otherwise inaccessible by the user).

If the application supports re-mapping, illustrated block 46 determines whether the user is grasping the embedded keyboard (e.g., the user is looking at the computing device, which is not resting on a table or stored in a bag, purse, etc.). The determination at block 46 may take into consideration sensor data such as, for example, accelerometer data, gyroscope data, camera data, ambient light data, etc., obtained from one or more sensors on the computing device. If it is determined that the user is grasping the embedded keyboard and/or looking at the display of the computing device, illustrated block 48 provides for re-mapping a second subset of keys on the embedded keyboard to one or more different functions. The re-mapping at block 48 may involve the use of a translation table that is application specific. One example of a translation table, which may be obtained from the application, is shown below in Table I.

TABLE I

| Input Keystroke | Map to Device | Mapped Key |
|---|---|---|
| ENTER | Gamepad | FIRE |
| CAPSLk | Keypad | Arrow Left |
| SHIFT | Keypad | Arrow Left |
| TAB | Keypad | Arrow Right |
| Arrow Up | Joystick | MoveUp |
| Q | Keyboard | B |
| ... | ... | ... |

In addition to being application specific, the translation table may also be orientation specific. Thus, four versions of Table I might be provided to account for two possible landscape orientations (e.g., 180° out of phase with one another) and two possible portrait orientations (e.g., 180° out of phase with one another). Physical transitions of the computing device between portrait mode and landscape mode may be detected based on sensor data such as, for example, accelerometer data, gyroscope data, etc., obtained from one or more sensors on the computing device. In the illustrated example, any keys that are not specified in the translation table may be ignored, which effectively disables the key in question. If a completely empty table is received from the application, then the entire keyboard may be effectively disabled.

As will be discussed in greater detail, re-mapping the keys may involve sending a re-direct command to an embedded controller associated with the embedded keyboard. The re-direct command may instruct the embedded controller to send keystroke information to a sensor hub configured to apply the translation table re-mappings, rather than sending the keystroke information to the OS through a device driver. If either the application does not support keyboard re-mapping or the user is not grasping the embedded keyboard, illustrated block 50 disables the remaining keys on the embedded keyboard.

Figure 3:
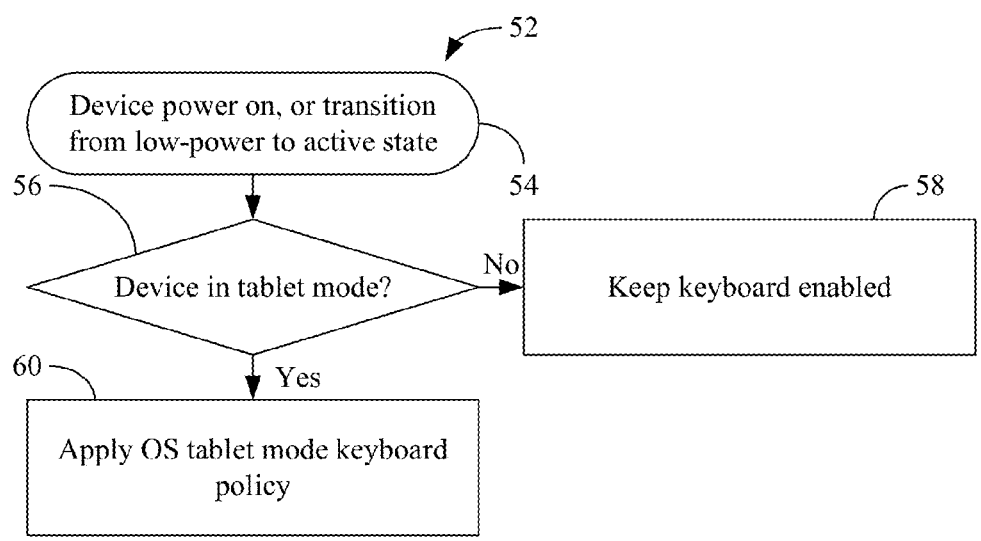
FIG. 3 is a flowchart of an example of a method of activating an alternate keyboard in response to a transition of a computing device into an active state according to an embodiment.

FIG. 3 shows a method 52 of activating an alternate keyboard in response to a transition of a computing device into an active state (e.g., the event includes a transition of the computing device into the active state). More particularly, the computing device powers on or transitions from a low-power state to the active state at illustrated block 54. A determination may be made at block 56 as to whether the computing device is in the tablet mode. If not, the physical keyboard may be kept enabled in its entirety at block 58. Otherwise, an OS tablet mode keyboard policy may be applied at block 60. As already noted, the OS tablet mode keyboard policy might re-map groups of keys to OS functions such as, for example, moving tiles left or right, opening system charm/menu screens and/or other OS controls.

Figure 4:
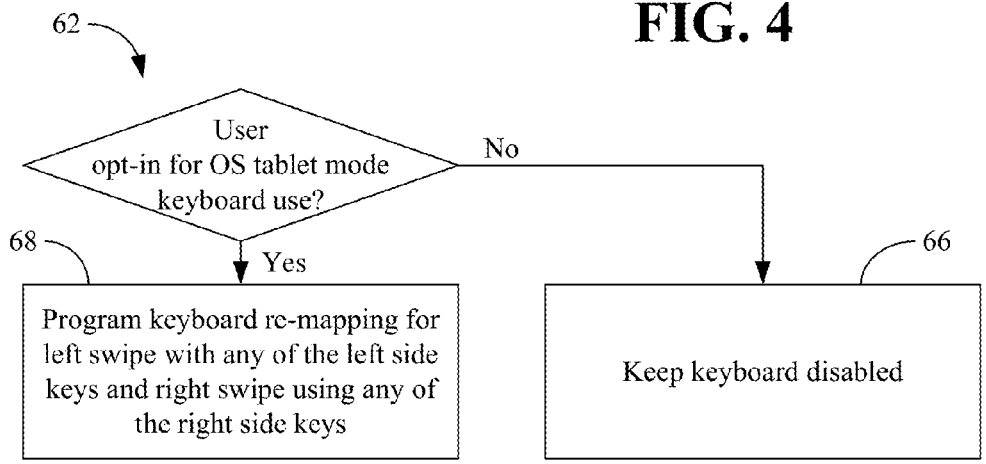
FIG. 4 is a flowchart of an example of a method of activating an alternate keyboard for an operating system according to an embodiment.

FIG. 4 shows a method 62 of activating an alternate keyboard for an OS. Illustrated block 64 provides for determining whether the user has opted-in for OS tablet mode keyboard use. If not, the keyboard may be kept disabled in its entirety at block 66. Otherwise, illustrated block 68 programs the keyboard re-mapping to conduct a left swipe with any touch of the left side keys and a right swipe with any touch of the right side keys, wherein the swipe functions may result in moving tiles left or right, opening system charm/menu screens and/or other OS controls.

Figure 5:
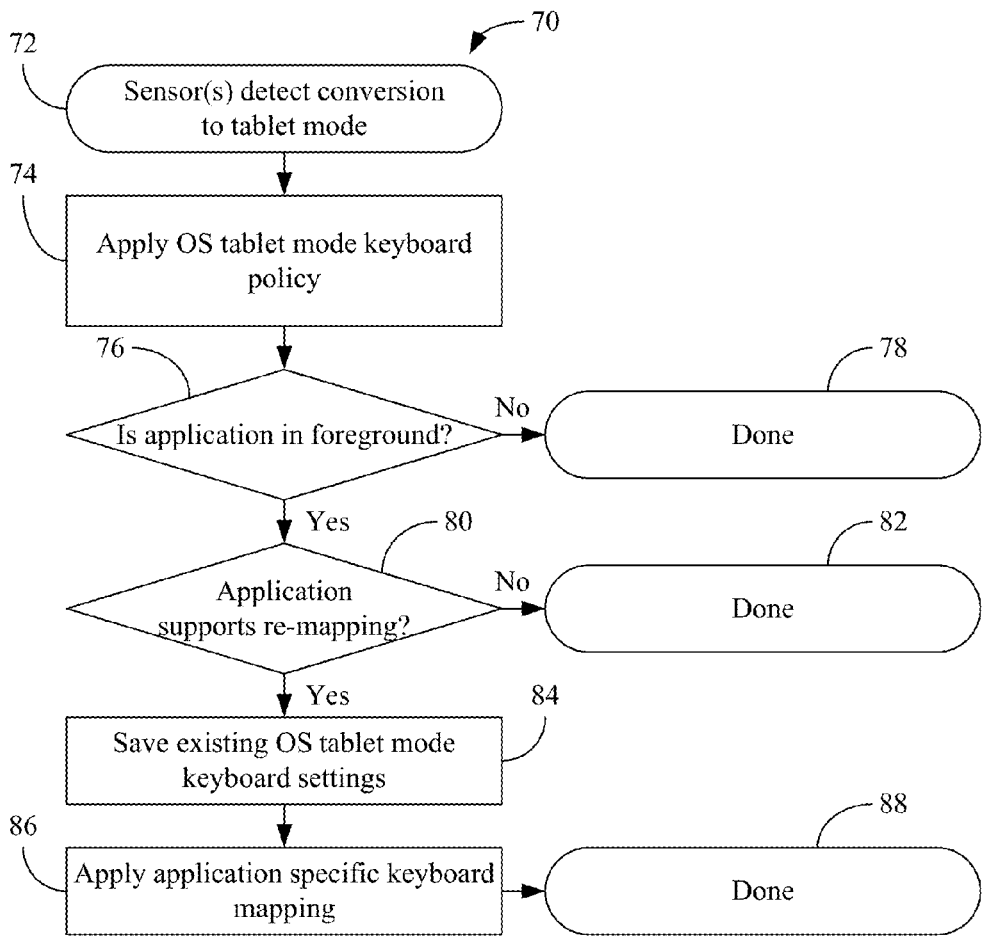
FIG. 5 is a flowchart of an example of a method of activating an alternate keyboard in response to a physical transition of a computing device into a tablet mode according to an embodiment.

Turning now to FIG. 5, a method 70 of activating an alternate keyboard in response to a physical transition of a computing device into the tablet mode (e.g., the event includes the conversion into tablet mode). More particularly, one or more sensors on the computing device may detect the conversion (e.g., physical transition by the user) of the computing device into tablet mode at block 72. The OS tablet mode keyboard policy may be applied at block 74, wherein a determination may be made at block 76 as to whether an application is running and in the foreground (e.g., an application other than the OS). If not, the process may terminate at block 78. Otherwise, illustrated block 80 determines whether the application in the foreground supports keyboard re-mapping. If not, the process may terminate at block 82. If the application supports keyboard re-mapping, the existing OS tablet mode keyboard settings/policy may be saved at block 84. Additionally, an application specific keyboard mapping may be applied at block 86 to achieve the alternate keyboard and the process may terminate at block 88.

Figure 6:
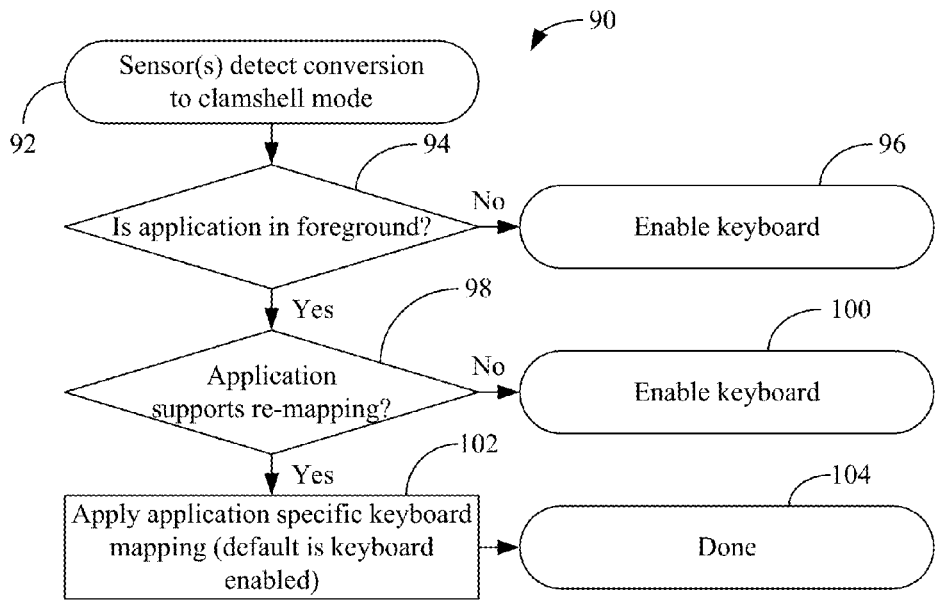
FIG. 6 is a flowchart of an example of a method of activating an alternate keyboard in response to a physical transition of a computing device into a clamshell mode according to an embodiment.

FIG. 6 shows a method 90 of activating an alternate keyboard in response to a physical transition of a computing device into a clamshell mode (e.g., the event includes a conversion into clamshell mode). More particularly, one or more sensors on the computing device may detect the conversion (e.g., physical transition by the user) of the computing device into clamshell mode at block 92. Block 94 may determine whether an application is running and in the foreground. If not, the keyboard may be enabled in its entirety at block 96. Otherwise, a determination may be made at block 98 as to whether the application in the foreground supports keyboard re-mapping. If not, the keyboard may be enabled in its entirety at block 100. If the application supports keyboard re-mapping, illustrated block 102 applies an application specific keyboard mapping to achieve the alternate keyboard. Thus, the illustrated approach enables applications to override default key mappings even when the computing device is in the clamshell mode. The illustrated process may terminate at block 104.

Figure 7:
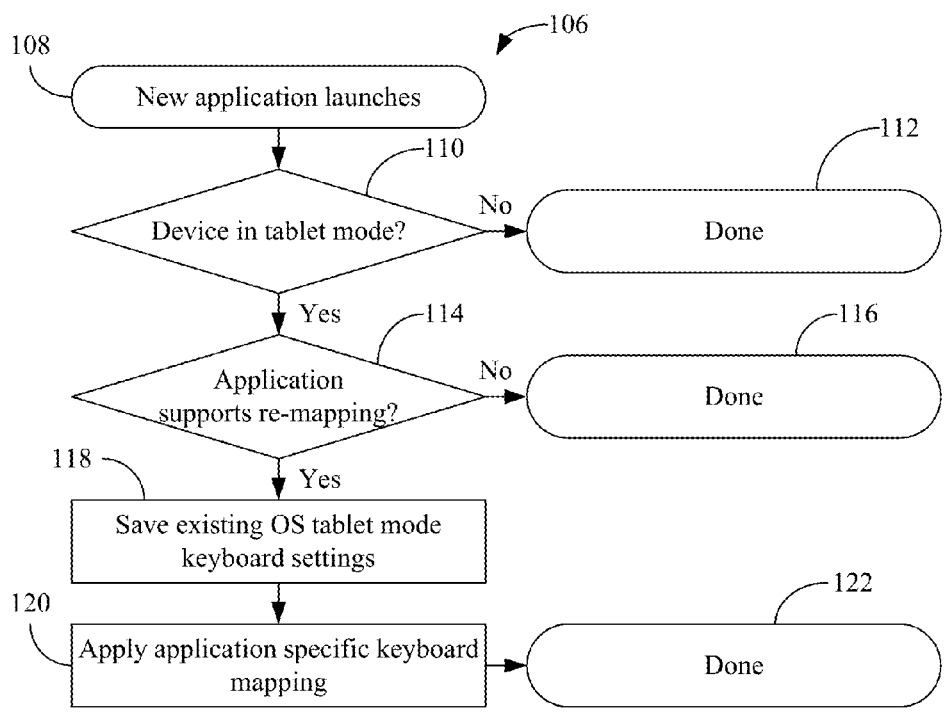
FIG. 7 is a flowchart of an example of a method of activating an alternate keyboard in response to a launch of an application according to an embodiment.

FIG. 7 shows a method 106 of activating an alternate keyboard in response to a launch of an application (e.g., the event includes the launch of the application). More particularly, the application may launch at block 108, wherein illustrated block 110 determines whether the computing device is in the tablet mode 110. If not, the process may terminate at block 112. Otherwise, block 114 determines whether a running application (e.g., in the foreground) supports keyboard re-mapping. If not, the process may terminate at block 116. If the application supports keyboard re-mapping, illustrated block 118 saves the existing OS tablet mode keyboard settings/policy and an application specific keyboard mapping may be applied at block 120 to achieve the alternate keyboard. The process may terminate at block 122.

Figure 8:
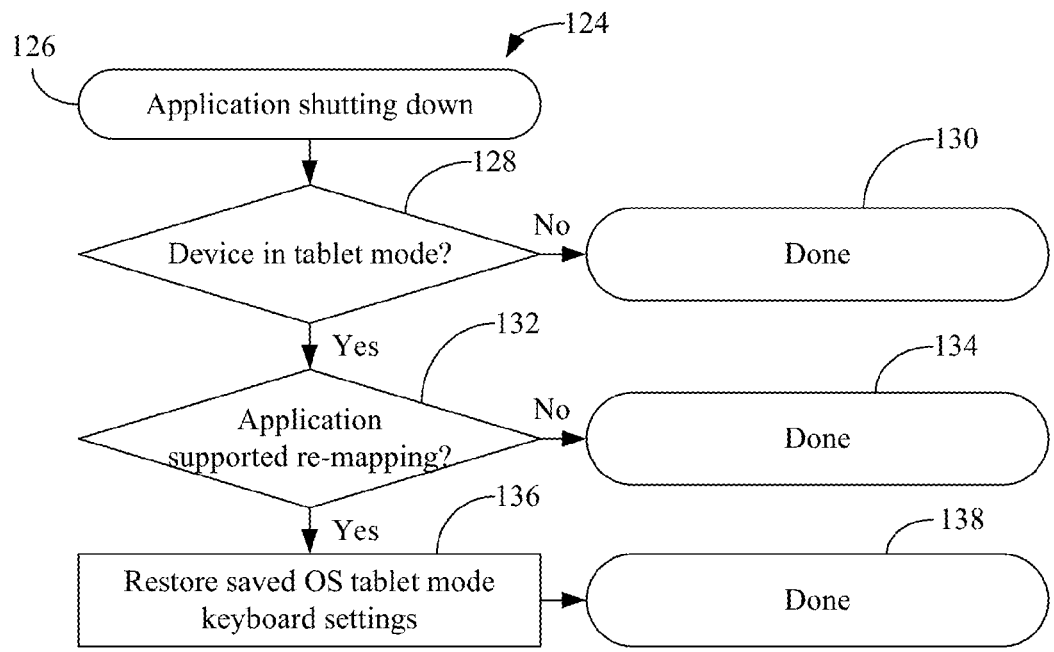
FIG. 8 is a flowchart of an example of a method of switching between alternate keyboards in response to an application shutdown according to an embodiment.

Turning now to FIG. 8, a method 124 of switching between alternate keyboards in response to an application shutdown (e.g., the event includes the application shutdown) is shown. More particularly, the application may begin shutting down at block 126, wherein a determination may be made at block 128 as to whether the computing device is in tablet mode 128. If not, the process may terminate at block 130. Otherwise, a determination may be made at block 132 as to whether the application that is shutting down supported application specific re-mapping. If not, the process may terminate at block 134. If the user has opted-in for OS tablet mode, illustrated block 136 restores the saved OS tablet mode keyboard settings/policy and the process may terminate at block 138.

Figure 9:
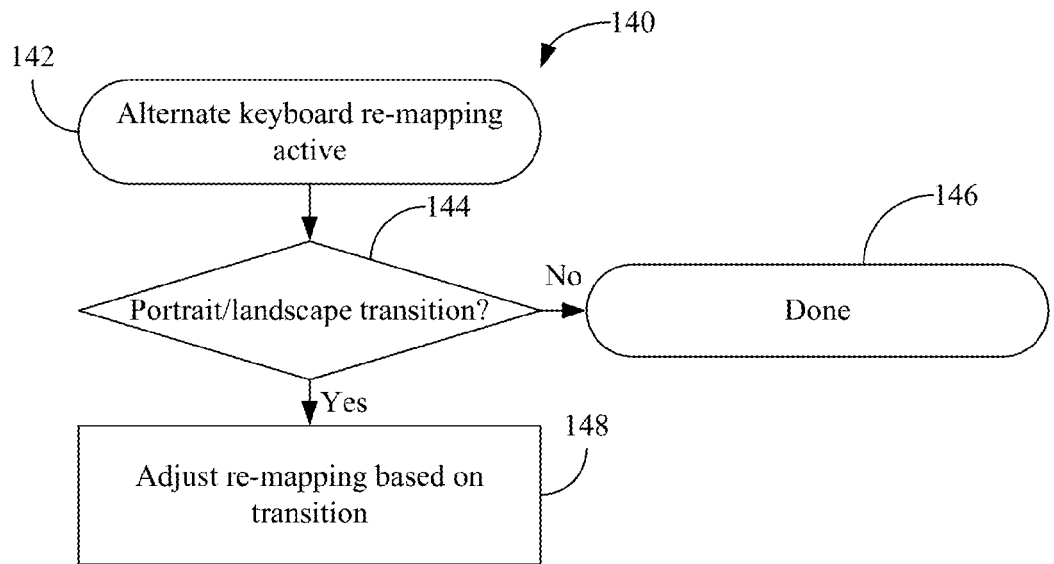
FIG. 9 is a flowchart of an example of a method of switching between alternate keyboards in response to a physical transition of a computing device between landscape and portrait orientations according to an embodiment.

FIG. 9 shows a method 140 of switching between alternate keyboards in response to a physical transition of a computing device between landscape and portrait orientations. More particularly, an alternate keyboard re-mapping may be active at block 142, wherein illustrated block 144 determines whether a transition between portrait mode and landscape mode has taken place. If not, the process may terminate at block 146. If a transition between portrait mode and landscape mode has taken place, the re-mapping of keys may be adjusted at block 148 based on the transition.

The methods of FIGS. 2-9 may be implemented in one or more modules as a set of logic instructions stored in a machine- or computer-readable storage medium such as random access memory (RAM), read only memory (ROM), programmable ROM (PROM), firmware, flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof.

Figure 10:
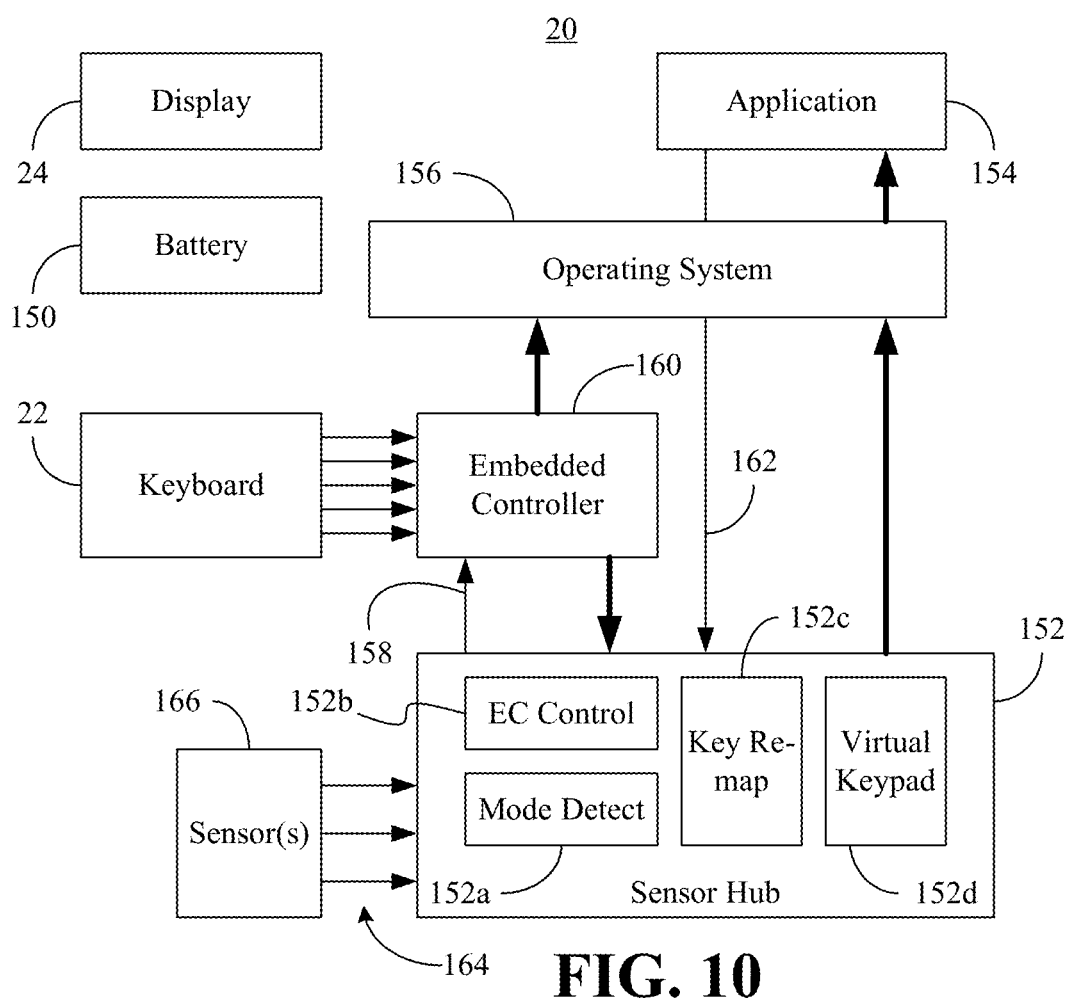
FIG. 10 is a block diagram of an example of a computing device according to an embodiment.

FIG. 10 shows one approach to implementing the computing device 20, already discussed in reference to FIG. 1. In the illustrated example, a battery 150 supplies power to the computing device 20 and the embedded keyboard 22 has a default mapping of keys to functions (e.g., pressing the "Q" key results in a "Q" keystroke). A sensor hub 152 (152a-152d) may have mode detect logic 152a to detect an event on the computing device 20 and embedded controller (EC) control logic 152b to send a re-direct command 158 to an embedded controller 160 associated with the embedded keyboard 22 in response to the event. Moreover, key re-map logic 152c may disable a first set of keys on the embedded keyboard 22 in response to the event and re-map a second subset of keys on the embedded keyboard 22 to one or more different functions if an application such as an application 154 or an operating system 156 supports keyboard re-mapping. The key re-map logic 152c may group two or more keys in the second subset into a common function. In one example, the key re-map logic 152c uses a translation table (e.g., such as Table I) to re-map the keys. In addition, virtual keypad logic 152d may emulate a virtual gamepad, joystick and/or keypad, and convert keystrokes into a specific set of controls on these devices.

As already noted, the event may include a physical transition of the computing device 20 into the tablet mode. In such a case, the event may be detected based on sensor data 164 obtained from one or more sensors 166 (e.g., accelerometers, gyroscopes, lid switches, cameras, etc.). For example, mathematical calculations may be used to determine the angle between the base and the lid when detecting the tablet mode. The sensor hub 152 may also fuse data from the sensors 166 and other sources, and present the fused data to the operating system 156 as one or more virtual sensors. Additionally, the mode detect logic 152a may determine whether the user is grasping the embedded keyboard 22 and/or looking at the display 24, wherein the key re-map logic 152c re-maps the second subset of keys only if the user is grasping the embedded keyboard 22 and/or looking at the display 24. Moreover, the key re-map logic 152c may adjust the re-mapping of the second subset of keys in response to a physical transition of the computing device between the portrait mode and the landscape mode. The event may also be a transition of the computing device 20 into the active state while the computing device 20 is in the tablet mode, a launch of the application 154 while the computing device 20 is in the tablet mode, and so forth.

In other examples, the keyboard re-mapping functionality may be used in transition (e.g., in between) modes. For example, as soon as the tablet is being converted from clamshell mode to tablet mode, the keyboard may be completely disabled. When the device is fully converted to tablet mode, then the partial set of keys might be re-mapped.

Additional Notes and Examples

Example 1 may include an apparatus to control keyboard mapping, comprising logic, implemented at least partially in fixed-functionality hardware, to detect an event on a computing device having an embedded keyboard with a default mapping of keys to functions, disable a first subset of keys on the embedded keyboard in response to the event, and re-map a second subset of keys on the embedded keyboard to one or more different functions if an application running on the computing device supports keyboard re-mapping.

Example 2 may include the apparatus of Example 1, wherein the logic is to group two or more keys in the second subset into a common function.

Example 3 may include the apparatus of Example 1, wherein the event is to be detected based on sensor data associated with the computing device and the event is to be a physical transition of the computing device into a tablet mode.

Example 4 may include the apparatus of Example 3, wherein the logic is to use the sensor data to determine whether a user is grasping the embedded keyboard, and wherein the second subset of keys is re-mapped only if the user is grasping the embedded keyboard.

Example 5 may include the apparatus of Example 1, wherein the event is to be one of a transition of the computing device into an active state while the computing device is in a tablet mode or a launch of the application while the computing device is in the tablet mode.

Example 6 may include the apparatus of any one of Examples 1 to 5, wherein the logic is to send a re-direct command to an embedded controller associated with the embedded keyboard.

Example 7 may include the apparatus of any one of Examples 1 to 5, wherein the logic is to adjust the re-mapping of the second subset of keys in response to a physical transition of the computing device between a portrait mode and a landscape mode.

Example 8 may include a computing device to control keyboard mapping, comprising a battery to supply power to the computing device, an embedded keyboard with a default mapping of keys to functions, and a sensor hub including logic, implemented at least partially in fixed-functionality hardware, to detect an event on the computing device, disable a first subset of keys on the embedded keyboard in response to the event, and re-map a second subset of keys on the embedded keyboard to one or more different functions if an application running on the computing device supports keyboard-remapping.

Example 9 may include the computing device of Example 8, wherein the logic is to group two or more keys in the second subset into a common function.

Example 10 may include the computing device of Example 8, wherein the event is to be detected based on sensor data associated with the computing device and the event is to be a physical transition of the computing device into a tablet mode.

Example 11 may include the computing device of Example 10, wherein the logic is to use the sensor data to determine whether a user is grasping the embedded keyboard, and wherein the second subset of keys is re-mapped only if the user is grasping the embedded keyboard.

Example 12 may include the computing device of Example 8, wherein the event is to be one of a transition of the computing device into an active state while the computing device is in a tablet mode or a launch of the application while the computing device is in the tablet mode.

Example 13 may include the computing device of any one of Examples 8 to 12, further including an embedded controller associated with the embedded keyboard, wherein the logic is to send a re-direct command to the embedded keyboard.

Example 14 may include a method of controlling keyboard mapping, comprising detecting an event on a computing device having an embedded keyboard with a default mapping of keys to functions, disabling a first subset of keys on the embedded keyboard in response to the event, and re-mapping a second subset of keys on the embedded keyboard to one or more different functions if an application running on the computing device supports keyboard re-mapping.

Example 15 may include the method of Example 14, wherein re-mapping the second subset of keys includes grouping two or more keys in the second subset into a common function.

Example 16 may include the method of Example 14, wherein the event is detected based on sensor data associated with the computing device and the event is a physical transition of the computing device into a tablet mode.

Example 17 may include the method of Example 14, wherein the event is one of a transition of the computing device into an active state while the computing device is in a tablet mode or a launch of the application while the computing device is in the tablet mode.

Example 18 may include the method of any one of Examples 14 to 17, wherein re-mapping the second subset of keys includes sending a re-direct command to an embedded controller associated with the embedded keyboard.

Example 19 may include at least one computer readable storage medium comprising a set of instructions which, when executed by a computing device having an embedded keyboard with a default mapping of keys to functions, cause the computing device to detect an event on the computing device, disable a first subset of keys on the embedded keyboard in response to the event, and re-map a second subset of keys on the embedded keyboard to one or more different functions if an application running on the computing device supports keyboard re-mapping.

Example 20 may include the at least one computer readable storage medium of Example 19, wherein the instructions, when executed, cause the computing device to group two or more keys in the second subset into a common function.

Example 21 may include the at least one computer readable storage medium of Example 19, wherein the event is to be detected based on sensor data associated with the computing device and the event is to be a physical transition of the computing device into a tablet mode.

Example 22 may include the at least one computer readable storage medium of Example 21, wherein the instructions, when executed, cause the computing device to use the sensor data to determine whether a user is grasping the embedded keyboard, and wherein the second subset of keys is re-mapped only if the user is grasping the embedded keyboard.

Example 23 may include the at least one computer readable storage medium of Example 19, wherein the event is to be one of a transition of the computing device into an active state while the computing device is in a tablet mode or a launch of the application while the computing device is in the tablet mode.

Example 24 may include the at least one computer readable storage medium of any one of Examples 19 to 23, wherein the instructions, when executed, cause the computing device to send a re-direct command to an embedded controller associated with the embedded keyboard.

Example 25 may include the at least one computer readable storage medium of any one of Examples 19 to 23, wherein the instructions, when executed, cause the computing device to adjust the re-mapping of the second subset of keys in response to a physical transition of the computing device between a portrait mode and a landscape mode.

Example 26 may include an apparatus to control keyboard mapping, comprising means for performing the method of any one of Examples 7 to 11.

Thus, techniques described herein may enable two-handed use of a tablet, which may in turn enhance the user experience. Moreover, new usage models may result from the ability to re-map keys from their default functions to virtually any functions supported by the applications running on the device. Additionally, grouped re-mapping of keys may reduce the level of precision needed on the part of the user to control the device.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
    logic, implemented on a hardware that is at least partially fixed, to:
    detect an event on a computing device having an embedded keyboard with a default mapping of keys to functions,
    disable a first subset of keys on the embedded keyboard in response to the event, and
    re-map a second subset of keys on the embedded keyboard to one or more different functions if an application running on the computing device supports keyboard re-mapping,
    wherein the event is to be detected based on sensor data associated with the computing device and the event is to be a physical transition of the computing device into a tablet mode, the tablet mode comprising the embedded keyboard folded behind a touch enabled display in a single piece configuration,
    wherein the logic is to use the sensor data to determine whether a user is grasping the embedded keyboard, and wherein the second subset of keys is re-mapped if the user is grasping the embedded keyboard.

2. The apparatus of claim 1, wherein the logic is to group two or more keys in the second subset into a common function.

3. The apparatus of claim 1, wherein the event is to be one of a transition of the computing device into an active state while the computing device is in a tablet mode or a launch of the application while the computing device is in the tablet mode.

4. The apparatus of claim 1, wherein the logic is to send a re-direct command to an embedded controller associated with the embedded keyboard.

5. The apparatus of claim 1, wherein the logic is to adjust the re-mapping of the second subset of keys in response to a physical transition of the computing device between a portrait mode and a landscape mode.

6. A computing device comprising:
    a battery to supply power to the computing device; an embedded keyboard with a default mapping of keys to functions; and
    a sensor hub including logic, implemented at least partially in fixed-functionality hardware, to:
    detect an event on the computing device,
    disable a first subset of keys on the embedded keyboard in response to the event, and re-map a second subset of keys on the embedded keyboard to one or more different functions if an application running on the computing device supports keyboard re-mapping,
    wherein the event is to be detected based on sensor data associated with the computing device and the event is to be a physical transition of the computing device into a tablet mode, the tablet mode comprising the embedded keyboard folded behind a touch enabled display in a single piece configuration,
    wherein the logic is to use the sensor data to determine whether a user is grasping the embedded keyboard, and wherein the second subset of keys is re-mapped if the user is grasping the embedded keyboard.

7. The computing device of claim 6, wherein the logic is to group two or more keys in the second subset into a common function.

8. The computing device of claim 6, wherein the event is to be one of a transition of the computing device into an active state while the computing device is in a tablet mode or a launch of the application while the computing device is in the tablet mode.

9. The computing device of claim 6, further including an embedded controller associated with the embedded keyboard, wherein the logic is to send a re-direct command to the embedded keyboard.

10. A method comprising:
    detecting an event on a computing device having an embedded keyboard with a default mapping of keys to functions;
    disabling a first subset of keys on the embedded keyboard in response to the event; and
    re-mapping a second subset of keys on the embedded keyboard to one or more different functions if an application running on the computing device supports keyboard re-mapping, wherein the event is detected based on sensor data associated with the computing device and the event is a physical transition of the computing device into a tablet mode, the tablet mode comprising the embedded keyboard folded behind a touch enabled display in a single piece configuration, wherein the logic is to use the sensor data to determine whether a user is grasping the embedded keyboard, and wherein the second subset of keys is re-mapped if the user is grasping the embedded keyboard.

11. The method of claim 10, wherein re-mapping the second subset of keys includes grouping two or more keys in the second subset into a common function.

12. The method of claim 10, wherein re-mapping the second subset of keys includes sending a re-direct command to an embedded controller associated with the embedded keyboard.

13. At least one non-transitory computer readable storage medium comprising a set of instructions which, when executed by a computing device having an embedded keyboard with a default mapping of keys to functions, cause the computing device to: detect an event on the computing device; disable a first subset of keys on the embedded keyboard in response to the event; and re-map a second subset of keys on the embedded keyboard to one or more different functions if an application running on the computing device supports keyboard re-mapping, wherein the event is to be detected based on sensor data associated with the computing device and the event is to be a physical transition of the computing device into a tablet mode, the tablet mode comprising the embedded keyboard folded behind a touch enabled display in a single piece configuration, wherein the instructions, when executed, cause the computing device to use the sensor data to determine whether a user is grasping the embedded keyboard, and wherein the second subset of keys is re-mapped if the user is grasping the embedded keyboard.

14. The at least one computer readable storage medium of claim 13, wherein the instructions, when executed, cause the computing device to group two or more keys in the second subset into a common function.

15. The at least one computer readable storage medium of claim 13, wherein the event is to be one of a transition of the computing device into an active state while the computing device is in a tablet mode or a launch of the application while the computing device is in the tablet mode.

16. The at least one computer readable storage medium of claim 13, wherein the instructions, when executed, cause the computing device to send a re-direct command to an embedded controller associated with the embedded keyboard.

17. The at least one computer readable storage medium of claim 13, wherein the instructions, when executed, cause the computing device to adjust the re-mapping of the second subset of keys in response to a physical transition of the computing device between a portrait mode and a landscape mode.

* * * * *